United States Patent
Kettler et al.

(10) Patent No.: US 7,805,516 B2
(45) Date of Patent: Sep. 28, 2010

(54) ENABLING THROTTLING OF RESOURCES ON A VIRTUALIZATION ENABLED INFORMATION HANDLING SYSTEM

(75) Inventors: Kevin Kettler, Austin, TX (US); Yuan-Chang Lo, Austin, TX (US); Liam Quinn, Austin, TX (US); Shree Dandekar, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 246 days.

(21) Appl. No.: 12/251,001

(22) Filed: Oct. 14, 2008

(65) Prior Publication Data

US 2010/0095000 A1    Apr. 15, 2010

(51) Int. Cl.
*G06F 15/16* (2006.01)
*G06F 15/173* (2006.01)
*G06F 9/455* (2006.01)

(52) U.S. Cl. .................. 709/226; 709/223; 709/224; 709/229; 718/1

(58) Field of Classification Search ............ 709/223, 709/224, 226, 229, 218; 718/101, 104
See application file for complete search history.

(56) References Cited

U.S. PATENT DOCUMENTS

| | | | |
|---|---|---|---|
| 7,711,822 B1 * | 5/2010 | Duvur et al. ............. | 709/229 |
| 7,748,005 B2 * | 6/2010 | Romero et al. ............. | 718/104 |
| 2002/0013802 A1 * | 1/2002 | Mori et al. ............. | 709/1 |
| 2005/0232192 A1 | 10/2005 | Rawson, III | |
| 2005/0257078 A1 | 11/2005 | Bose et al. | |
| 2006/0242330 A1 | 10/2006 | Torudbakken et al. | |
| 2006/0242332 A1 | 10/2006 | Johnsen et al. | |
| 2006/0242352 A1 | 10/2006 | Torudbakken et al. | |
| 2006/0242354 A1 | 10/2006 | Johnsen et al. | |
| 2006/0253619 A1 | 11/2006 | Torudbakken et al. | |
| 2007/0124100 A1 | 5/2007 | Aguilar, Jr. et al. | |
| 2007/0124101 A1 | 5/2007 | Aguilar, Jr. et al. | |
| 2007/0124102 A1 | 5/2007 | Aguilar, Jr. et al. | |
| 2007/0124103 A1 | 5/2007 | Aguilar, Jr. et al. | |
| 2007/0169121 A1 * | 7/2007 | Hunt et al. ............. | 718/1 |
| 2007/0198656 A1 * | 8/2007 | Mazzaferri et al. ........ | 709/218 |
| 2007/0234360 A1 | 10/2007 | Locker et al. | |
| 2007/0245050 A1 | 10/2007 | Gregg et al. | |
| 2007/0260893 A1 | 11/2007 | Aguilar, Jr. et al. | |
| 2007/0260895 A1 | 11/2007 | Aguilar, Jr. et al. | |
| 2009/0037585 A1 * | 2/2009 | Miloushev et al. ........ | 709/226 |
| 2009/0271472 A1 * | 10/2009 | Scheifler et al. .......... | 709/202 |

* cited by examiner

*Primary Examiner*—Quang N. Nguyen
(74) *Attorney, Agent, or Firm*—Hamilton & Terrile, LLP; Stephen A. Terrile

(57) ABSTRACT

A system for enabling throttling of resources, including central processing units (CPUs) and peripherals, on a virtualization-enabled information handling system such as a CE type information handling system is set forth. With the system for enabling throttling of resources, each virtual appliance within an information handling system is configured with its resource needs.

11 Claims, 5 Drawing Sheets

ENABLING THROTTLING OF RESOURCES ON A VIRTUALIZATION ENABLED INFORMATION HANDLING SYSTEM

BACKGROUND OF THE INVENTION

1. Field of the Invention

The present invention relates to information handling systems and more particularly to enabling throttling of resources, including central processing units (CPUs) and peripherals, on a virtualization enabled information handling system such as a consumer electronics (CE) platform.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Consumer electronics devices continue to mature to include consumer electronics type information handling systems. Consumer electronics type information handling systems enable content migration from a media information handling system to a living room as well as enabling televisions for broadband. One example of such a consumer electronics type information handling system includes a digital media adapter (DMA) functionality using software such as the Microsoft Media Center extender technology software. Such a system provides no control over a software architecture to enable future services and provides no manufacturer differentiation.

Other issues relating to consumer electronics type information handling systems include limited adoption due to high set up costs and customer awareness. Often known solutions lack flexibility in terms of controlling software and hardware distribution. Often known solutions do not offer personalization and/or differentiation.

Attempting to address these issues via known information handling system platforms can also present challenges. For example, known information handling system platforms generally use well-defined development evolution based upon standard architectures. Also within known information handling system platforms, extensibility for added features is usually enabled using add in network interface controllers and controllers in predefined expansion slots such as PCIe slots. Other expansion may be accomplished via an embedded controller for storage and multimedia playback devices. Such platforms have often include well defined end user models for Internet access, email and office type applications as well as the inability to provide a customer with a secure environment to plug in certain desired services or applications.

It is known to provide information handling systems with virtualization functionality. With a virtualization-enabled information handling system, a hypervisor enables basic computer system partitioning (i.e., partitioning of CPU, Memory, and I/O subsystem building elements). A hypervisor provides the virtualization abstraction between underlying information handling system hardware elements and the operating system on which end-user applications execute.

A virtual infrastructure includes virtual machines, virtualized host systems and a set of core cross-host virtualization services. The capabilities of the virtual infrastructure are defined as a part of the management interface. The management interface monitors virtual machine inventory, generates alerts, provides capacity planning, provides reporting functionality, and performs configuration tracking function.

Known management interfaces (e.g., hypervisors) provide a processor (i.e., a central processing unit (CPU)) throttling function to allow a fixed number of CPU cores to be associated with particular applications (e.g., a particular virtual machine (VM)). However, in a consumer or small business environment, it would be desirable to be able to dynamically allocate IT resources (such as CPU cores or a fraction of a core) to virtual machines rather than dedicating a single CPU core to a particular VM. For example, a system that could allocate half of a CPU core to a particular virtual machine. Also for example, if a virtual machine is an Internet banking VM, it would be desirable to be able to throttle down graphics resources of the information handling system so that other virtual machines could use more of the graphics resources.

It would also be desirable to provide an information handling system with the ability to throttle not only the CPU but also other peripheral devices such as a graphics-processing unit (GPU) and the network controller unit. For example, if a Blu-ray player is executing on the hypervisor as a virtual machine and a gaming virtual machine is executing on the same hypervisor. Both of these virtual machines will compete for GPU resources. It would be desirable to enable management of the resource allocation of the GPU without compromising the intended output from both of the virtual machines.

Also for example, a voice over Internet Protocol (VoIP) real-time appliance may need to be serviced at a periodic interval and with guaranteed network bandwidth and quality of service (QoS) to the Internet and to network attached storage (NAS). Additionally, a digital video recorder (DVR) type device can require guaranteed network bandwidth and QoS such as when the DVR is recording on an internet protocol base resource, such as an internet protocol digital video device (IPDVD).

Accordingly, it would be desirable to enable throttling of resources, including central processing units (CPUs) and peripherals, on a virtualization enabled information handling system such as a CE type information handling system.

SUMMARY OF THE INVENTION

In accordance with the present invention, a system for enabling throttling of resources, including central processing units (CPUs) and peripherals, on a virtualization enabled information handling system such as a CE type information handling system is set forth. With the system for enabling throttling of resources, each virtual appliance within an information handling system is configured with its resource needs.

More specifically, in operation when a new virtual appliance is added to the information handling system, a virtual appliance manager ensures there are no over subscription to particular resources. If there is a potential for a conflict (such as due to an over subscription), priority associated with each resource of each virtual appliance is checked to determine which virtual appliance should get a resource. Additionally, resources needed by any other virtual appliances are automatically throttled down to the remaining capacity of the system or the network. If the priority of the virtual appliance need for the resources is the same, the virtual appliance resources are throttled down equally until both virtual appliances can be accommodated. In certain embodiments, other attributes may be used as tiebreaker on equal priorities of a resource. For example, a VoIP virtual appliance versus a non-real-time latency sensitive applications such as an instant messaging/short message service (IM/SMS) type application.

In addition, in certain embodiments, when a resource request is throttled down, the user is notified of the event (e.g., via email or other notification mechanism). The notification can also include a link to a management web page. In other embodiments, the throttling is transparent to a user. Also, in certain embodiments, the user is offered possible resolutions of the conflict, such as for example, subscription to a higher grade of Internet access service, adding an additional drive in the server or network attached storage (NAS), adding additional memory or a higher performance processor in the information handling system, or even adding an additional virtual server.

In another embodiment, the throttling system can apply heuristic based prioritization when determining which resources to throttle for which virtual appliances. More specifically, based on an amount of usage of a particular virtual machine, a heuristics operation is used to assist in resource allocation. The heuristic operation resolves the prioritization by analyzing the virtual machines for specific attributes and characteristics for of the virtual machines and generating a prioritization based upon the attributes and characteristics of the virtual machines.

In another embodiment, the throttling system performs the throttling operation within the actual resources. In this embodiment, resources, such as the processor cores (both CPU and GPU) or other I/O device resources, include resource specific throttling functionality to facilitate throttling of those resources. In this embodiment, the throttling system maintains overall control of throttling within the information handling system and controls throttling across resources.

Additionally, in certain embodiments, the throttling system includes an ability to estimate resource needs on a per virtual machine basis and to allocate resources on a priority and application basis. Additionally, in certain embodiments, the throttling system dynamically changes a resource reservation based on needs of the virtual appliance. Additionally, in certain embodiments, resource allocation is based on heuristics of virtual machine usage. Additionally, in certain embodiments, the throttling system includes a notification mechanism to notify a user of resource allocation related throttling. Additionally, in certain embodiments, the throttling system performs resource allocation based on determination and knowledge of the network traffic, such as by deep packet inspection using for example, Internet Protocol version 6 (IPv6).

BRIEF DESCRIPTION OF THE DRAWINGS

The present invention may be better understood, and its numerous objects, features, and advantages made apparent to those skilled in the art by referencing the accompanying drawings. The use of the same reference number throughout the several figures designates a like or similar element.

DETAILED DESCRIPTION

Figure 1:
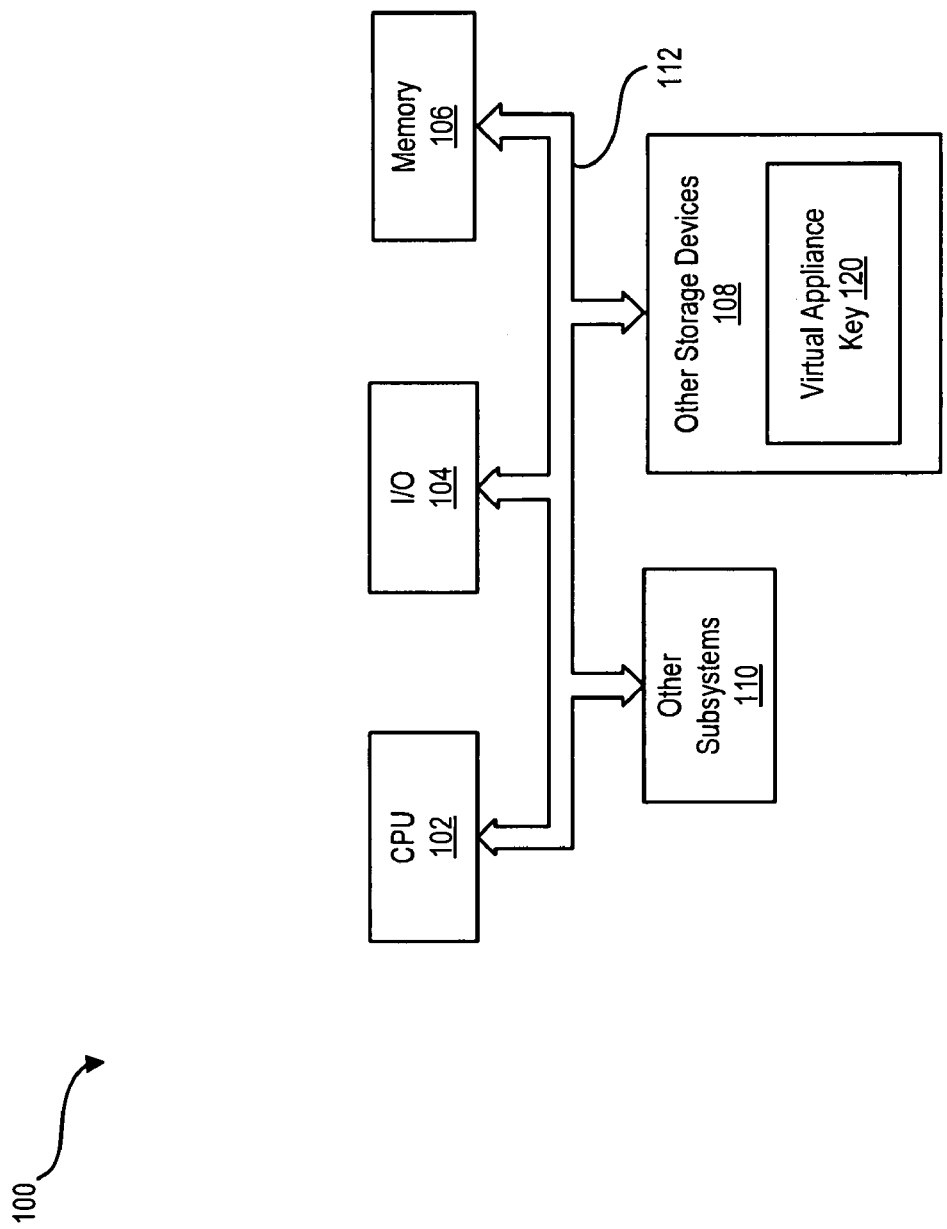
FIG. 1 shows a system block diagram of an information handling system.

Referring briefly to FIG. 1, a system block diagram of a consumer electronics type information handling system 100 is shown. The information handling system 100 includes a processor 102, input/output (I/O) devices 104, such as a display, a keyboard, a mouse, and associated controllers (each of which may be coupled to remotely to the information handling system 100), a memory 106 including volatile memory such as random access memory (RAM) and non-volatile memory such as a hard disk and drive, and other storage devices 108, such as an optical disk and drive and other memory devices, and various other subsystems 110, all interconnected via one or more buses 112. One example of another storage device 108 is a virtual appliance memory device such as a virtual appliance USB key 120.

The virtual appliance memory device 120 can include one or a plurality of virtual appliances. Each virtual appliance is a self-contained virtual machine that implements a solution such as a consumer solution (including an operating system (OS), and application and a default configuration). Examples of self-contained virtual machines can include a productivity module and browser, a media server/content delivery module, a home finance/online banking module, a gaming module, a personal networking module, a home automation and security module, and a home design and maintenance module. Because the virtual machines are self-contained and isolated using virtualization technology, each solution can be preconfigured and ready to use, without a customer having to install and configure the solution. Additionally, the virtual machines provide a stable platform that has no variability when moved from one user or system to another user or system.

Figure 2:
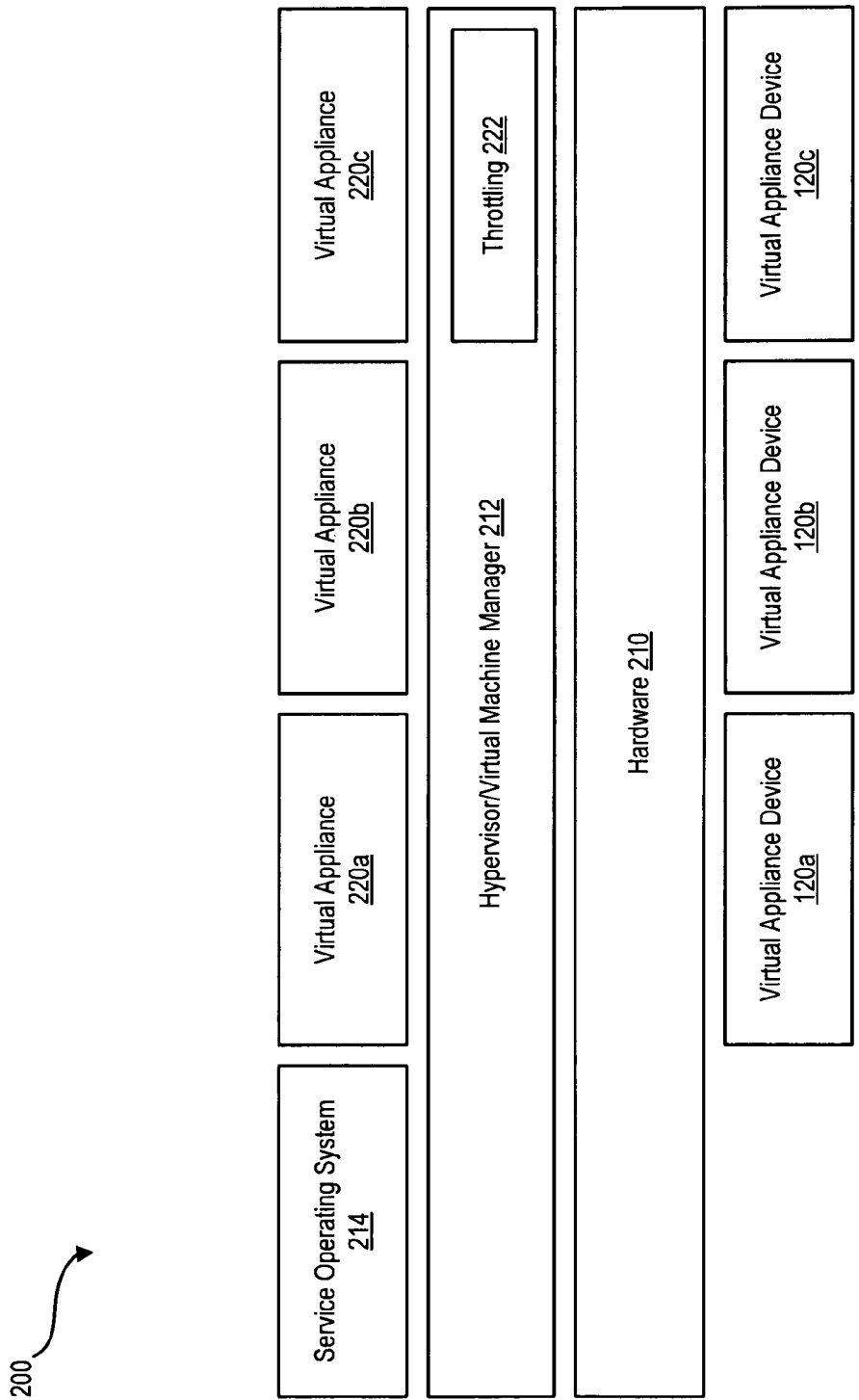
FIG. 2 shows a system block diagram of a consumer electronics type information handling system infrastructure architecture.

Each of the virtual appliances is installed on the information handling system 100 via a respective virtual appliance USB key 120 (e.g., a personalization pod). Using a virtual appliance USB key 120 not only simplifies an initial installation, but also subsequent need to move the virtual machine if the capacity of the information handling system is exceeded. FIG. 2 shows the architecture diagram of the consumer electronics type information handling system 100.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Referring to FIG. 2, a system block diagram of a information handling system infrastructure architecture 200 is shown. More specifically, information handling system hardware 210 executes a virtual machine monitor software 212 (which may be e.g., a hypervisor). The information handling system infrastructure architecture 200 also includes a service operation system 214 that is executed by the hardware 210.

One or more virtual appliance devices 120a, 120b, 120c may be coupled to the hardware 210. Each of the devices 120 allow a self contained virtual appliance 220 to be installed on the information handling system hardware 210. In certain embodiments, a digital certificate of authenticity (COA) is included with each virtual appliance 220. The COA is checked by the virtual hardware 210 before the appliance is installed onto the system 200.

The virtual machine monitor software 212 includes a throttling module 222. The throttling module 222 enables throttling of resources, including central processing units (CPUs) and peripherals, on the information handling system 100. With the throttling module 222, each virtual appliance 220 within the information handling system 100 may be configured with its respective resource needs.

A data structure with computing resource requirements is included with each virtual appliance. These include CPU requirements, memory requirements, storage requirements, and network bandwidth requirements. In certain embodiments, the data structure also includes a prioritization associated with each resource requirement.

Before a virtual appliance is installed, the virtual machine monitor 212 ensures that it has enough capacity to host the appliance. The virtual machine monitor 212 also contains a resource meter (which may be located on a panel of the information handling system) to represent current resource capacity and remaining resource capacity to simplify capacity planning. The virtual machine monitor 212 can also maintain a database of all virtual machines that have been coupled to the device. In this way if a virtual machine is removed and then reinserted, the certification process can be expedited. Additionally, in certain embodiments, the system may have a more limited set of virtual machines to which the system is authorized. In this case, the virtual machine monitor 212 can maintain information regarding the more limited set of virtual machines.

Figure 3:
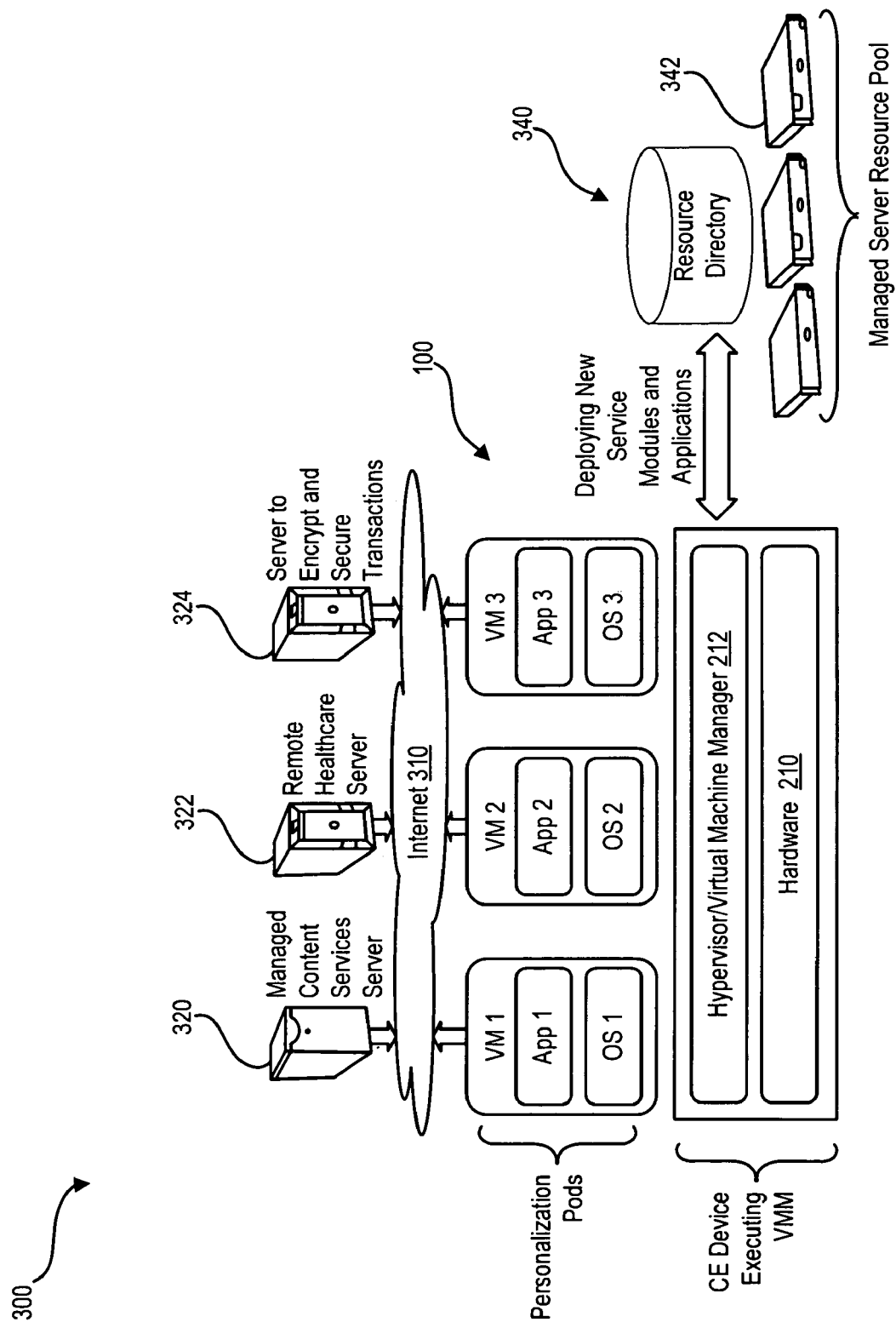
FIG. 3 shows a block diagram a consumer electronics type information handling system architecture environment.

FIG. 3 shows a block diagram a consumer electronics type information handling system architecture environment 300. More specifically, the information handling system 100 includes a plurality of application specific virtual machines (VM1, VM2, and VM3), which are loaded via respective virtual appliance memory devices. Each application specific virtual machine includes a corresponding operating system (OS1, OS2, and OS3) as well as a corresponding application (App1, App2, and App3). The operating systems and applications execute on the hardware 210 under the control of the virtual machine monitor 212. The virtual machines can access the Internet 310, either directly or via the hardware 210 of the system 100.

Each application may be directed to a particular consumer type application. For example, one application (e.g., App1) interacts with a managed content services server 320 via the Internet 310. Examples of manage content services include music types of services (such as download services or satellite radio services), video types of services (such as download services or video access services). Another application (e.g., App2) interacts with a remote healthcare server 322 via the Internet 310. The remote healthcare server enables a user to interact with hospitals or other types of health care services. The virtual machine includes any encryption information or patient information to facilitate the interaction with the healthcare server 322. Another application (e.g., App3) interacts with a banking server 324 via the Internet 310. The banking server enables a user to interact with various banks to perform various online banking transactions. The virtual machine includes any encryption information or customer information to facilitate the interaction with the banking server 322.

The consumer electronics type information handling system architecture environment 600 also includes a resource directory 640 having an associated managed server resource pool 642. The resource directory 640 is accessed by the system 100 when a virtual machine is coupled to the system to validate the virtual machine. The resource directory 640 can also provide service or update information to the system for each certified virtual machine.

Figure 4:
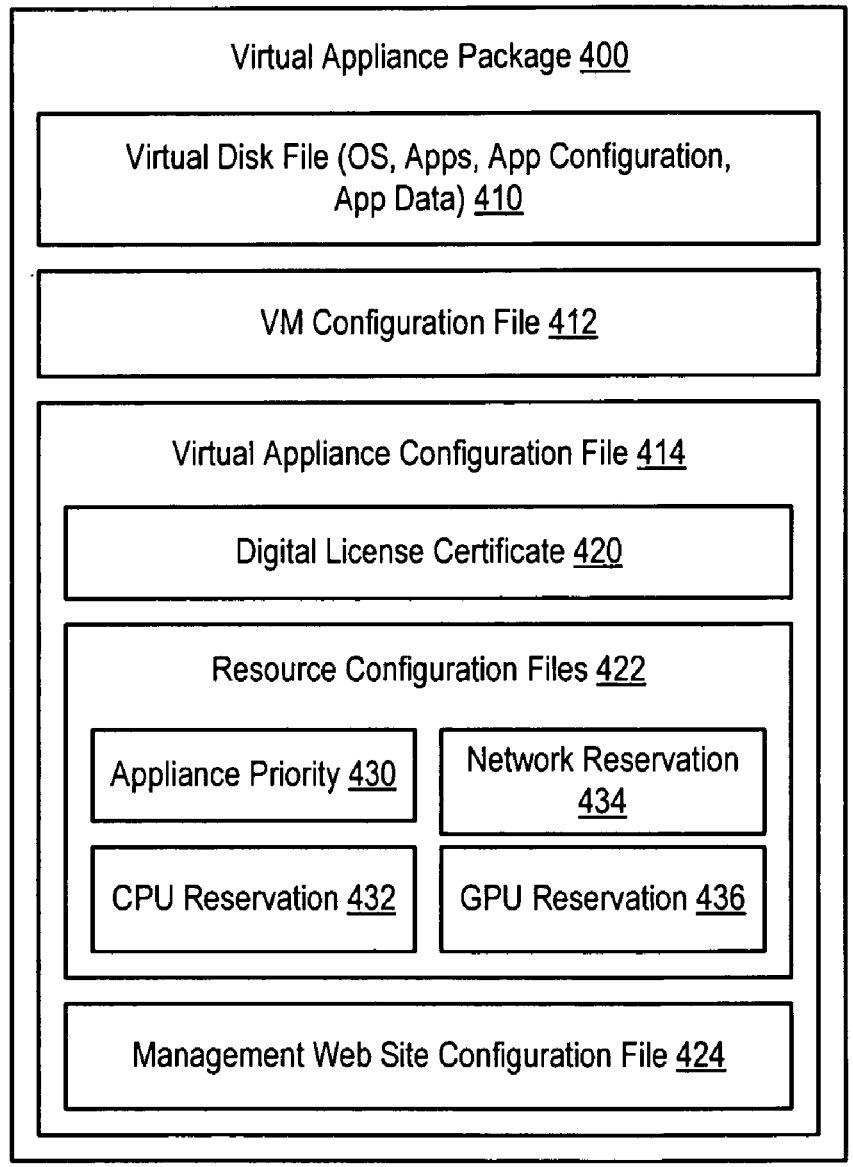
FIG. 4 shows a block diagram of a system for throttling virtual appliance resources within an information handling system.

Referring to FIG. 4, a block diagram of virtual appliance 400 that is optimized for throttling virtual appliance resources. More specifically, the virtual appliance 400 includes a virtual disk file portion 410, a virtual machine configuration file 412, and a virtual appliance configuration file 414. The virtual machine configuration file 412 specifies parameters for the virtual machine (e.g., for configuring the hypervisor) such as a number of processors, an amount of memory, storage requirements, network connections, etc. The virtual appliance configuration file 414 contains parameters for configuring the virtual appliance when executing on the host system.

The virtual machine configuration file 414 includes a digital license certificate 420, a resource configuration portion 422, and a management web site configuration portion 424. The web site configuration portion 424 includes information that may be used by certain web sites to interact with the web site. For example, the web site configuration portion 424 may include business logic specific cookies or any necessary authentication attributes as well as any other information that may be used to facilitate access to a particular web site.

The resource configuration portion 422 includes an appliance priority portion 430, a CPU reservation portion 432, a network reservation portion 434, and a GPU reservation portion 436. The appliance priority portion 430, CPU reservation portion 432, network reservation portion 434, and GPU reservation portion 436 are used by the throttling module 222 to determine how to best throttle the various information handling system resources.

Figure 5:
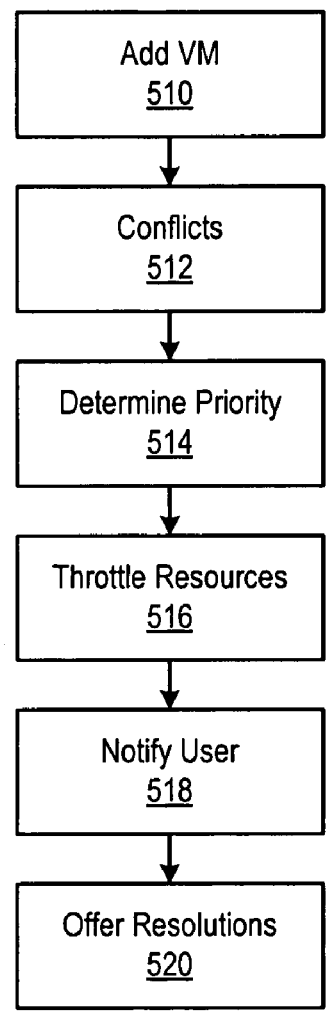
FIG. 5 shows a flow chart of the operation of the system for throttling virtual appliance resources.

Referring to FIG. 5, a flow chart of the operation of the system for throttling virtual appliance resources 500 is shown. More specifically, when a new virtual appliance is added to the information handling system at step 510, a virtual appliance manager determines whether there are any potential conflicts (e.g., such as determining whether there is an over subscription to particular resources) at step 512. If there is a potential for a conflict (such as due to an over subscription), priority associated with each resource of each virtual appliance is checked to determine which virtual appliance should get a resource at step 514.

Next, resources needed by any other virtual appliances are automatically throttled down to the remaining capacity of the system or the network at step 516. If the priority of the virtual appliances need for the resources is the same, the virtual appliance resources are throttled down equally until both virtual appliances can be accommodated. In certain embodiments, other attributes may be used as tiebreaker on equal priorities of a resource. For example, a VoIP virtual appliance versus a non-real-time latency sensitive applications such as an instant messaging/short message service (IM/SMS) type application.

Next, in certain embodiments, when a resource request is throttled down, the user is notified of the event (e.g., via email or other notification mechanism) at step 518. The notification can also include a link to a management web page. In other embodiments, the throttling is transparent to a user. In addition, in certain embodiments, the user is offered possible resolutions of the conflict at step 520. Possible resolutions can include an offer for a subscription to a higher grade of Internet access service, adding an additional drive in the server or network appliance storage (NAS), adding additional memory or a higher performance processor in the information handling system, or even adding an additional virtual server.

In another embodiment, the throttling system performs the throttling operation within the actual resources. In this embodiment, resources, such as the processor cores (both CPU and GPU) or other I/O device resources, include resource specific throttling functionality to facilitate throttling of those resources. In this embodiment, the throttling system maintains overall control of throttling within the information handling system and controls throttling across resources.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

For example, the virtual appliance memory device 120 may function as a license and resource management token and not necessarily as a storage device for the virtual appliance.

Also for example, in certain embodiments, the throttling system can apply heuristic based prioritization when determining which resources to throttle for which virtual appliances. More specifically, based on an amount of usage of a particular virtual machine, a heuristics operation is used to assist in resource allocation. The heuristic operation resolves the prioritization by analyzing the virtual machines for specific attributes and characteristics for of the virtual machines and generating a prioritization based upon the attributes and characteristics of the virtual machines.

Also for example, in certain embodiments, the throttling system includes an ability to estimate resource needs on a per virtual machine basis and to allocate resources on a priority and application basis. Additionally, in certain embodiments, the throttling system can dynamically change a resource reservation based on needs of the virtual appliance. Additionally, in certain embodiments, the throttling system performs resource allocation based on determination and knowledge of the network traffic, such as by deep packet inspection using for example, Internet Protocol version 6 (IPv6).

Also for example, the virtual machine manager may include a unique user interface that executes on the hypervisor and displays the current services that the customer can access. The user interface can also include notifications and messages to the user for different events and exceptions in a user-friendly format.

Also for example, the above-discussed embodiments include software modules that perform certain tasks. The software modules discussed herein may include script, batch, or other executable files. The software modules may be stored on a machine-readable or computer-readable storage medium such as a disk drive. Storage devices used for storing software modules in accordance with an embodiment of the invention may be magnetic floppy disks, hard disks, or optical discs such as CD-ROMs or CD-Rs, for example. A storage device used for storing firmware or hardware modules in accordance with an embodiment of the invention may also include a semiconductor-based memory, which may be permanently, removably, or remotely coupled to a microprocessor/memory system. Thus, the modules may be stored within a computer system memory to configure the computer system to perform the functions of the module. Other new and various types of computer-readable storage media may be used to store the modules discussed herein. Additionally, those skilled in the art will recognize that the separation of functionality into modules is for illustrative purposes. Alternative embodiments may merge the functionality of multiple modules into a single module or may impose an alternate decomposition of functionality of modules. For example, a software module for calling sub-modules may be decomposed so that each sub-module performs its function and passes control directly to another sub-module.

Consequently, the invention is intended to be limited only by the spirit and scope of the appended claims, giving full cognizance to equivalents in all respects.

What is claimed is:

1. A method for throttling resources of a virtual appliance enabled information handling system comprising:
   providing a virtual machine (VM) host comprising a plurality of VM resources operable to execute virtual machines;
   providing a virtual appliance, the virtual appliance comprising a digital certificate of authenticity, an application and a virtual appliance configuration file, the virtual appliance configuration file including an indication of resource needs of the application;
   throttling the plurality of VM resources based upon the indication of resource needs of the application, wherein the indication of resource needs of the application comprising an appliance priority indication and at least one of a processor reservation portion, a graphics processor reservation portion, and a network reservation portion;
   analyzing a resource capacity of the virtual machine host;
   installing the virtual appliance only when the virtual machine host has enough capacity to host the application; and
   checking the validity of the digital certificate of authenticity when the virtual appliance is installed onto the virtual machine host.

2. The method of claim 1 further comprising:
   dynamically changing a resource reservation based on needs of the virtual appliance.

3. The method of claim 1 further comprising:
   generating a notification to notify a user of resource allocation related throttling.

4. The method of claim 3 wherein:
the notification comprises information relating to throttling based upon knowledge of network traffic.

5. The method of claim 1 wherein:
the throttling is further based upon heuristics of virtual machine resource usage.

6. The method of claim 1 further comprising:
a plurality of virtual appliances, each of the plurality of virtual appliances comprising an application and a virtual appliance configuration file, the virtual appliance configuration file including an indication of resource needs of the application; and,
throttling the plurality of VM resources based upon the indication of resource needs of the application of each of the plurality of virtual appliances.

7. An apparatus for throttling resources of a virtual appliance enabled information handling system comprising:
at least one or more central processing units (CPUs);
a virtual machine (VM) host comprising a plurality of VM resources operable to execute virtual machines;
a virtual appliance, the virtual appliance comprising a digital certificate of authenticity, an application and a virtual appliance configuration file, the virtual appliance configuration file including an indication of resource needs of the application;
means for throttling the plurality of VM resources based upon the indication of resource needs of the application, wherein the indication of resource needs of the application comprising an appliance priority indication and at least one of a processor reservation portion, a graphics processor reservation portion, and a network reservation portion;
means for analyzing a resource capacity of the virtual machine host;
means for installing the virtual appliance only when the virtual machine host has enough capacity to host the application; and
means for checking the validity of the digital certificate of authenticity when the virtual appliance is installed onto the virtual machine host.

8. The apparatus of claim 7 further comprising:
means for generating a notification to notify a user of resource allocation related throttling.

9. The apparatus of claim 8 wherein:
the notification comprises information relating to throttling based upon knowledge of network traffic.

10. The apparatus of claim 7 wherein:
the throttling is further based upon heuristics of virtual machine resource usage.

11. The apparatus of claim 7 further comprising:
a plurality of virtual appliances, each of the plurality of virtual appliances comprising an application and a virtual appliance configuration file, the virtual appliance configuration file including an indication of resource needs of the application; and,
means for throttling the plurality of VM resources based upon the indication of resource needs of the application of each of the plurality of virtual appliances.

* * * * *